United States Patent
Predelli

(10) Patent No.: US 7,277,783 B2
(45) Date of Patent: Oct. 2, 2007

(54) MOTOR VEHICLE CONTROL SYSTEM AND METHOD FOR CONTROLLING A MOTOR VEHICLE

(75) Inventor: Oliver Predelli, Braunschweig (DE)

(73) Assignee: IAV GmbH Ingenieurgesellschaft Auto und Verkehr, Berlin (DE)

(*) Notice: Subject to any disclaimer, the term of this patent is extended or adjusted under 35 U.S.C. 154(b) by 270 days.

(21) Appl. No.: 10/491,395

(22) PCT Filed: Dec. 16, 2002

(86) PCT No.: PCT/DE02/04579

§ 371 (c)(1),
(2), (4) Date: Mar. 31, 2004

(87) PCT Pub. No.: WO03/052531

PCT Pub. Date: Jun. 26, 2003

(65) Prior Publication Data

US 2004/0236488 A1    Nov. 25, 2004

(30) Foreign Application Priority Data

Dec. 17, 2001  (DE) ................................ 101 62 853

(51) Int. Cl.
*G06F 17/00* (2006.01)
(52) U.S. Cl. ...................................................... 701/48
(58) Field of Classification Search .................. 701/48; 700/5

See application file for complete search history.

(56) References Cited

U.S. PATENT DOCUMENTS

| 4,839,798 A * | 6/1989 | Eguchi et al. ............... 718/105 |
| 5,369,581 A | 11/1994 | Toshimichi et al. |
| 5,544,054 A | 8/1996 | Toshimichi et al. |
| 5,761,516 A * | 6/1998 | Rostoker et al. ............ 710/260 |
| 6,336,128 B1 | 1/2002 | Eisenmann et al. |
| 2001/0016789 A1 | 8/2001 | Staiger |
| 2003/0041217 A1* | 2/2003 | Terada et al. ................ 711/154 |

FOREIGN PATENT DOCUMENTS

| DE | 197 48 536 | 5/1999 |
| DE | 197 50 026 | 6/1999 |

* cited by examiner

Primary Examiner—Thu V. Nguyen
(74) Attorney, Agent, or Firm—Collard & Roe, P.C.

(57) ABSTRACT

A motor vehicle control system has at least two separate control units, which are interconnected via a bus system, each control unit controlling respective individual vehicle components. The control system effectively uses the memory location and computing time resources that exist within a combination of control units, thus assuring processing of the routines that can take place in real time. Use of the existing resources is assured without additional hardware expenditure.

14 Claims, 1 Drawing Sheet

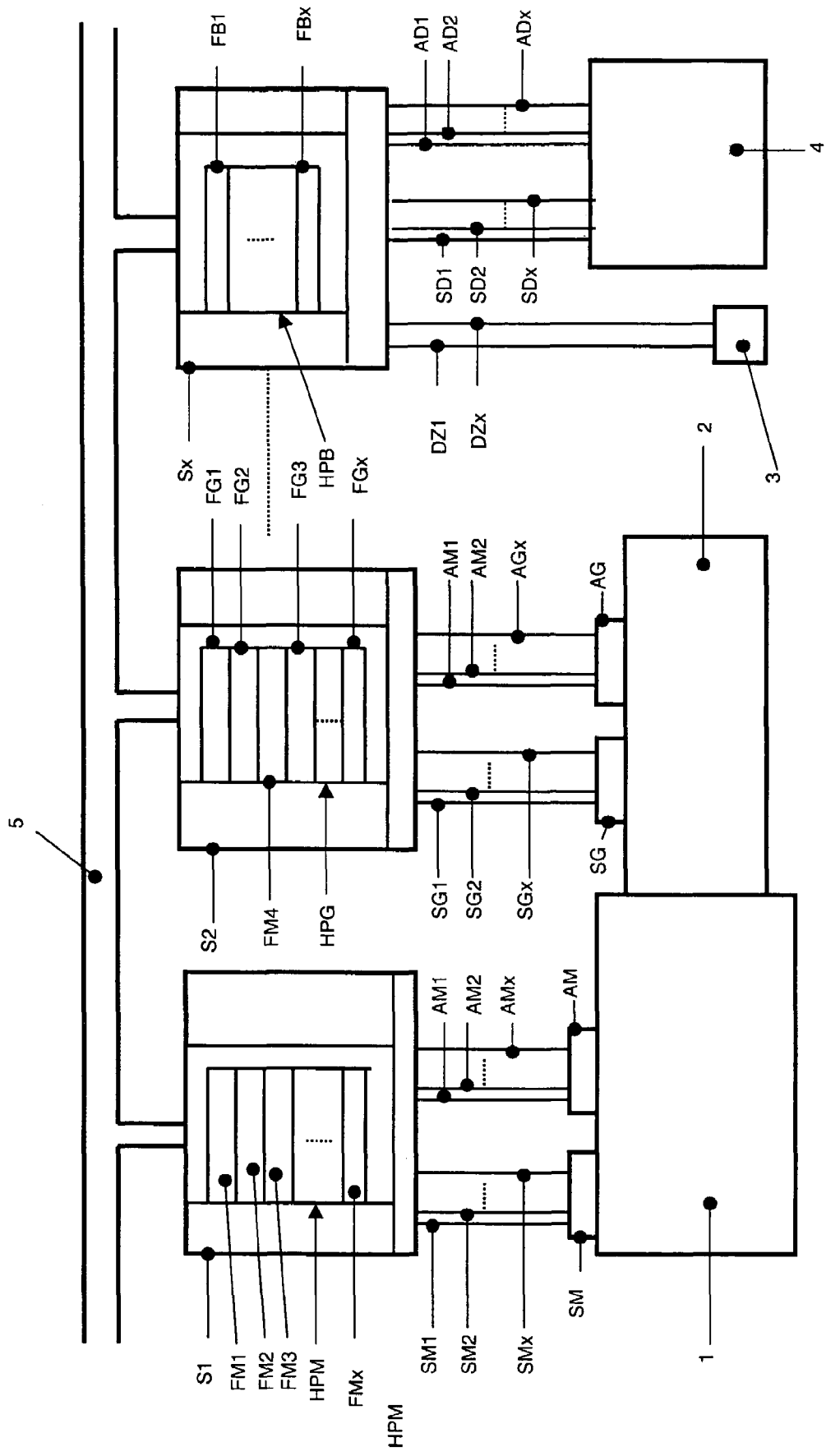

MOTOR VEHICLE CONTROL SYSTEM AND METHOD FOR CONTROLLING A MOTOR VEHICLE

CROSS REFERENCE TO RELATED APPLICATIONS

Applicant claims priority under 35 U.S.C. §119 of German Application No. 101 62 853.6 filed on Dec. 17, 2001. Applicant also claims priority under 35 U.S.C. § 365 of PCT/DE02/04579 filed on Dec. 16, 2002. The international application under PCT article 21(2) was not published in English.

BACKGROUND OF THE INVENTION

1. Field of the Invention

The invention relates to a motor vehicle control system having at least two separate control units, which are connected with one another by way of a bus system, and a method for controlling motor vehicle components by means of the motor vehicle control system.

2. The Prior Art

It is generally and previously known to provide a combination of control devices in vehicles, whereby a separate control device is provided for individual functions (engine control, transmission control, ABS, etc.), in each instance. In this connection, the control devices are connected by way of a bus system and can communicate with one another, exchange data, etc. The constant expansion of functionality has the result, particularly in the case of complex control devices, such as the engine control device, of rapid changes in the control device hardware, whereby the memory space, I/O ports, and computer performance are expanded. As soon as control devices and software are ready for series production, their capacity limits are already reached. Time-consuming and cost-intensive adaptation of the control devices to the increased demand for memory space and computing speed, in each instance, are the result.

A method for operating a control device for a motor vehicle, in which two control units are connected by way of a data bus, is previously known from DE 197 50 026 A1. If it is determined, during operation of the control units, that one of the control devices has reached its performance limit, control device functions are temporarily transferred to the second control device and performed there. In this connection, the program code of the function is transmitted to this control device, or a function implemented in dual manner, that is already present on the second control device, is utilized. It is a disadvantage with this method of procedure that the entire program code has to be transmitted once, or that the functions have to be implemented in the control devices in dual manner. This results in additional memory requirements and is impossible for complex functions. Furthermore, a significant effort has to be made for temporarily transferring the functions. The capacity of the control device to which they are transferred must be checked, the program structures are switched over to the control device to which the function is being delegated, since a new function has to be linked. This is impossible, in particular, for time-critical and safety-relevant functions.

The use of a client/server architecture on a vehicle control device combination is previously known from DE 197 48 536 C2. Here, the individual application functions are described independent of the devices and addressed by way of a communication interface. Any communication between the processes therefore generates a data exchange, which must take place by way of the bus system. The individual application functions can therefore be implemented only once, in order to save space, and are available to several requesters. The method requires an additional level (function monitor level) that functions as a central control unit as well as a central memory for the individual systems (clients/servers). It is a problem, in this connection, that the individual functions can be called up by several requesters at the same time, and that the response times are lengthened due to the sequential processing. Use under real-time conditions, such as for an engine control device, for example, is therefore problematic.

The significant advantage of the client/server architecture lies in the central management of the functions, whereby these only have to be implemented once for the applications, in each instance. The individual vehicle control devices, e.g. engine control device, transmission control device, ABS control device, have only very few functions in common, however, so that the construction of a client/server architecture for common use of the functions does not produce any decisive advantages.

SUMMARY OF THE INVENTION

It is the task of the invention to effectively utilize the resources of memory space and computing time that exist within a combination of control devices of a motor vehicle and, in this connection, to assure processing of the routines that can take place in real time. The method is supposed to assure utilization of the existing resources, without additional hardware expenditure.

This task is accomplished, in the case of motor vehicle control systems of the type stated, according to the invention, by means of the characterizing features of claims 1–8 and, in the case of methods for controlling a motor vehicle, of the type stated, according to the invention, by means of the characterizing features of claims 9–16.

Usually, the processing of control functions takes place in a control device specifically provided for the vehicle component. Thus, for example, the engine control algorithms such as calculation of the characteristic variables for injection and ignition, AGR, cooling, error management, driving speed regulation, etc., are processed in the engine control device, while a transmission control device is provided for controlling the transmission, and an ABS control device is provided for implementing anti-lock strategies to brake the vehicle.

If the functions stored in the control device must be expanded, or if new functions have to be added, one rapidly reaches the limits of the individual control devices with regard to memory space and computing capacity, so that a new generation of control devices, having expanded memory space and higher processing speeds, must be introduced. However, expansion of the functions does not proceed uniformly in all the control devices, so that memory space might still be available in the transmission control device, for example, and computing capacity is also available, while adding a new function, e.g. for direct fuel injection, to the engine control device, is not possible because its memory space and computing capacity are no longer sufficient. Until now, if a control device had reached its capacity limit with regard to memory space and/or computing performance, the use of a new control device took place.

It is now advantageous that according to the invention, a program that is to be processed in a control device is divided up, whereby functions from the control device that has reached its capacity limit are transferred to a control device having available resources. In this connection, the program code of the function that was taken out of the program is transferred to the "foreign" control device. Processing of the transferred function also takes place on the processor of the "foreign" control device. The requirements for computing, any transfer values, as well as the input and output variables are exchanged by way of a bus system that connects the control devices.

It is advantageous that according to the invention, the functions that require a large amount of memory space and/or computing time but for which no great requirements in terms of real-time capability are set are those that are transferred out of the control devices. The overall system remains real-time capable, since the lengthened response times that result from communication by way of the bus system only affect the non-time-critical functions that have been transferred out. By means of transferring out non-time-critical functions, room is made for those functions for which greater requirements with regard to the response times are set.

The selection of the transferred functions can also be based on purely practical considerations, in that newly added functions are transferred to a foreign control device independent of their need for memory space and computing time. The function to be newly implemented in the combination of control devices is then not implemented in the control device that is specifically intended for the control task of the vehicle component, if the latter has reached its capacity limit. This newly added function is transferred to a foreign control device. The algorithms that previously ran on the control device do not have to be changed for this, whereby the structure that might already have been tested and proven can be maintained.

It is advantageous that according to the invention, the functions that set low requirements with regard to the data exchange with the actual main program are those that are transferred from a control device that is working at its capacity limit in terms of memory space and/or computing time. The amount of additional data to be transmitted by way of the bus system can therefore be kept low, and this assures a lower load for the bus system, for one thing, and faster processing of the transferred function, for another thing.

At present, the design of control device functions for vehicle control devices extensively takes place using hardware-independent development tools such as ASCET-SD or MATLAB. In this connection, the functions are described by means of block schematics, status graphs, signal links, etc. Here, the generation of the control code for a specific platform takes place only after the hardware-independent design. The design method thereby makes it possible to isolate individual functions from the total program, in simple manner.

It is advantageous that according to the invention, if the free resources of all of the control devices of the combination of control devices are utilized, and if the control functions are distributed to other control devices, new control devices that have been expanded in terms of computing performance and memory capacity have to be introduced only if the resources of all the control devices that were present in the vehicle before and were connected by way of a bus system have been exhausted.

It is advantageous that according to the invention, functions from the engine control device, in particular, are transferred to a different control device, for example the transmission control device of the vehicle. The expansion of the engine control device that becomes necessary due to new algorithms that have been introduced into the control device, for example for direct fuel injection, or due to expansion of existing algorithms, is postponed by means of transfer of non-time-critical functions, such as driving speed regulation and/or air conditioning system control and/or engine cooling/fan control and/or anti-theft lock, until all the control devices arranged in the combination of control devices of the vehicle have been utilized to their full capacity in terms of computing time and memory space.

The motor vehicle control system according to the invention offers the possibility of transferring a large number of functions from one control device to one or more other, different control devices. In this connection, distributing the functions is possible without any change in the existing control devices and their connections with one another. The possibility therefore exists of fitting expanded and/or additional algorithms into an existing control device structure. New algorithms can therefore not only be introduced in connection with a new design, but also retrofitted into existing structures, as long as resources with regard to memory space and computing performance are still available in one of the control devices that is part of the combination of control devices.

BRIEF DESCRIPTION OF THE DRAWINGS

In the following, am exemplary embodiment of the invention will be described using a drawing.

The sole drawing shows an exemplary embodiment of the motor vehicle control system according to the invention.

Referring to the drawing, a control device Si that serves to control an engine 1, a control device S2 that controls a transmission that belongs to the engine, and a control device Sx, which controls the brake pressure of the vehicle brakes, for example (ABS control device) are shown as examples. The control devices Sl–Sx are connected with one another by way of a bus system 5 of the vehicle, e.g. a CAN bus. Sensors SM and actors AM are arranged on the engine 1, the measurement and control signals SMl–SMx and AMl–AMx of which are applied to the control device S1, i.e. are controlled by the latter. Sensors SG and actors AG are arranged on the transmission 2, the measurement and control signals SG1–SGx and AGl–AGx of which are applied to the control device S2, i.e. are controlled by the latter. Sensors SD and actors AD are arranged on the brake pressure control 4, the measurement or control signals SMl–SMx and ANl–AMx of which are applied to the control device Sx, i.e. are controlled by the latter. Furthermore, the signals DZl–DZ4 of the wheel rotation speed sensors 3 are applied to the control device.

Programs for controlling a vehicle component are stored in the control devices S1–Sx, in each instance.

A program HPM for engine control is stored in the control device S1. The program consists of the functions FM1–FMx, which determine parameters and/or process measurement values of the sensors SM and/or determine control variables for the actors AM. The program HPM for controlling the engine runs on the processor of the control device 1. As already described, greater demands on the control device S1 with regard to memory space and computing capacity can come about as the result of necessary expansion of the functions FM1-FMx, or as the result of newly added functions. If the device has reached its capacity limit, it would have to be replaced with a new control device provided with expanded memory space and a greater computing capacity. However, additional control devices S2–Sx are present in the vehicle. A program HPG, which consists of functions FG1–FGx for controlling the transmission is stored in the control device S2. The program HPG is carried out on the processor of the control device 2. Another program HPB having functions for controlling the brake pressure FB1–FBx is stored in the control device Sx, whereby it is carried out on the processor of this control device Sx.

If an increased demand for computing and/or memory capacity in the control device S1 is required, memory space and computing capacity can be made available in the control device 1 by means of transferring out individual functions, such as the function FM4, in this example, to a different control device, namely S2 here.

The function FM4, which contains the driving speed regulation, for example, is then stored on the control device S2 for controlling the transmission, and runs on the processor of this control device S2. The necessary parameters are made available by the control device S1, by way of the bus system 5. The parameters calculated by the function FM4, for example an injection amount necessary in order to implement the desired speed of the vehicle, can be called up by the control device S1 by way of the bus system 5. The parameters calculated in the control device S2 in this manner are processed further in the control device S1, i.e. they can form the setting variables for the actors AM for controlling the engine. The function FM4 is linked with the program for controlling the transmission, HPG, but runs extensively isolated from the latter in terms of data exchange.

As shown with the example of the function FM4, other functions of controlling the engine can also be transferred to the control device S2 for controlling the transmission. It is also possible to transfer the functions to other control devices, for example the control device Sx that is shown. Another possibility is to divide several functions of the engine control device FM1–FMx, which are to be transferred out, among different control devices, so that parts of the engine control are stored and carried out in the transmission control device SG and other parts in the control device Sx.

In one embodiment, the functions that have been transferred out of the control device Si have a lower number of input and/or output variables than the functions that are stored in the control device and are carried out within the program that runs on this control device Si. In addition, the function or functions that have been transferred out of the control device Si and run on the other control device S2 or the other control devices S2–Sx may have a lower number of input and/or output variables than the functions that are stored in the control device 51 and may be carried out within the program that runs on this control device S1.

REFERENCE SYMBOL LIST 1 engine
2 transmission
3 wheel rotation speed sensor
4 brake pressure control
5 bus system
S1 control device for controlling the engine
S2 control device for controlling the transmission
Sx control device for controlling the brake pressure
HPM program for controlling the engine
HPG program for controlling the transmission
HPB program for controlling the brake pressure
FM1–FMx functions for controlling the engine
FG1–FGx functions for controlling the transmission
FB1–FBx functions for controlling the brake pressure
SM1–SMx signals of the sensors for controlling the engine
SG1–SGx signals of the sensors for controlling the transmission
DZ1–DZ4 signals of the wheel rotation speed sensors
SD1–SDx signals of the pressure control
AD1–ADx signals for controlling the actors for brake pressure control
AG1–AGx signals for controlling the actors for engine control
AM1–AMx signals for controlling the actors for transmission control
SM sensors for controlling the engine
AM actors for controlling the engine
SG sensors for controlling the transmission
AG actors for controlling the transmission

The invention claimed is:

1. A motor vehicle control system comprising at least first and second separate control devices interconnected via a bus system, each control device controlling an associated individual vehicle component, wherein said first control device has a first processor and at least one first control device program stored in said first control device having at least one function specified in a program code carried out by said first processor that is transferred from said first control device to said second control device and is linked with a program sequence of a second control device program running on the second control device and processed on a second processor of the second control device, said at least one function having input and output variables transmittable between the second control device and the first control device via the bus system;

wherein several functions of the first control device program that is stored on the first control device and runs on said first control device are transferred from said first control device to a respective one of a plurality of transferee control devices, each function transferred from said first control device having a respective program code stored in a respective one of the plurality of transferee control devices, each function of the respective transferee control device being linked with a respective control device program that runs on the transferee control device, whereby the functions transferred from said first control device are thereby distributed over the transferee control devices with regard to memory storage in memory and implementation; and wherein the functions transferred out of the first control device are new functions that have been added to existing functions previously stored in the first control device in the course of the development of the first control device and have been isolated from said existing functions.

2. The motor vehicle control system according to claim 1, wherein the functions that have been transferred out of the first control device have longer response times than the functions that are stored in the first control device and are carried out within the first control device program that runs on the first control device.

3. The motor vehicle control system according to claim 1, wherein the functions that have been transferred out of the first control device have a lower number of input or output variables than the functions that are stored in the first control device and are carried out within the first control device program that runs on the first control device.

4. The motor vehicle control system according to claim 1, wherein
the functions that have been transferred out of the first control device have a greater need for memory space than the functions that are stored in the first control device and are carried out within the first control device program that runs on the first control device.

5. The motor vehicle control system according to claim 1, wherein
the first control device from which the program code of at least one function that has been transferred out of the first control device program that runs on the first control device controls the vehicle engine.

6. The motor vehicle control system according to claim 5, wherein
the functions that have been transferred out of the first control device program that runs on the first control device regulate speed or cool the engine or control the fan or implement an anti-theft lock or operate a pre-glow function for glow pins or regulate exhaust gas recycling or recognize a driver's wishes by way of the gas pedal or implement error management.

7. The motor vehicle control system according to claim 1, wherein
the second control device to which the program code of said at least one function transferred out of the first control device program that runs on the first control device has been transferred controls the transmission.

8. A method for controlling a motor vehicle having a control system comprising at least first and second control devices interconnected via a bus system, each control device controlling an associated individual vehicle component, wherein the control devices have independent programs comprising a plurality of functions running in the control devices, said method comprising the steps of:
(a) transferring from the first control device to the second control device via the bus system at least one first control device program having at least one function for controlling a vehicle component associated with the first control device stored in the first control device, the at least one function having input and output variables transmitted between the first control device and the second control device via the bus system;
(b) linking the at least one function of the at least one first control device program to a second control device program running in the second control device; and
c) carrying out the at least one function via the second control device program;
wherein several functions of the first control device program that is stored on the first control device and runs on the first control device are transferred from the first control device to a respective one of a plurality of transferee control devices, each function transferred from the first control device having a respective program code stored in a respective one of the plurality of transferee control devices, each function being carried out within a respective control device program that runs on the respective transferee control device, and the functions transferred from the first control device to the respective transferee control devices make output variables available for the first control device program that is running on the first control device via the bus system; and
wherein the functions transferred out of the first control device are new functions that have been added to existing functions previously stored in the first control device in the course of the development of the first control device and have been isolated from said existing functions.

9. The method for controlling a motor vehicle according to claim 8, wherein
each function that has been transferred from the first control device and run on the respective transferee control device has a longer response time than the functions that are stored in the first control device and are carried out within the first control device program that runs on the first control device.

10. The method for controlling a motor vehicle according to claim 8, wherein
each function that has been been transferred from the first control device and run on the respective transferee control device has a lower number of input or output variables than the functions that are stored in the first control device and are carried out within the first control device program that runs on the first control device.

11. The method for controlling a motor vehicle according to claim 8, wherein
each function that has been been transferred from the first control device and run on the respective transferee control device require more memory space than the functions that are stored in the first control device and are carried out within the first control device program that runs on the first control device.

12. The method for controlling a motor vehicle according to claim 8, wherein
the program code of at least one function is transferred out of the first control device program that serves to control an engine, and the first control device program runs on the first control device that controls the engine.

13. The method for controlling a motor vehicle according to claim 12, wherein
at least one function runs on at least one of the transferee control devices the at least one function having been transferred from the first control device program that runs on the first control device and serving to regulate speed or control the air conditioning system or cool the engine or control the fan or implement an anti-theft lock or operate a pre-glow function for glow pins or recognize a driver's wishes by way of the gas pedal or regulate exhaust gas recycling or implement error management.

14. The method for controlling a motor vehicle according to claim 8, wherein one of the transferee control devices running at least one function transferred from the first control device program that runs on the first control device controls the transmission.

* * * * *